United States Patent Office 3,251,823
Patented May 17, 1966

3,251,823
NITROCELLULOSE PROCESS USING
EMULSIFYING AGENTS
Charles V. Murphy, Merchantville, N.J., and John R. Ness, New Castle, Del., assignors to E. I. du Pont de Nemours and Company, Wilmington, Del., a corporation of Delaware
No Drawing. Filed May 15, 1962, Ser. No. 194,991
3 Claims. (Cl. 260—223)

The present invention relates to a process for the manufacture of small particles of nitrocellulose, hereinafter called NC.

NC is of considerable interest as a polymeric binder in the formulation of solid propellants useful for rocketry, missiles and the like. Such propellant compositions currently include an oxidizer, a fuel, and a binder. In some cases, a constituent can behave in more than one manner. Thus, nitrocellulose can be both an oxidizer and a fuel as well as a binder. It has a relatively low energy content however, and current propellant compositions contain an oxidizer such as ammonium perchlorate, along with fuel such as aluminum powder.

The present invention provides a process for the manufacture of small particle nitrocellulose which comprises agitating a mixture of water, a water-immiscible solvent for nitrocellulose, an anionic emulsifying agent, a nonionic emulsifying agent and nitrocellulose, heating the mixture while continuing agitation to distill off the solvent-water azeotrope, and separating the particles of nitrocellulose by appropriate means from the excess liquid present.

Optionally, a protective colloid may be present in the mixture but such a compound is not necessary for good results. Agitation is necessary during distillation in order to maintain the spherical shape of the particles as the solvent is distilled off and to prevent agglomeration of the NC spheres.

The nitrocellulose used in the practice of the present invention is the grade known in the industry as pyro NC. This grade contains about 12.6% nitrogen. However, the nitrogen content may range from about 12% to about 13%. In order that the NC have as much energy content as possible, it should have as high a nitrogen content as possible without impairing its solubility properties. Although the NC does not go into solution in the process of the present invention, its solubility properties are important because of their effect on the properties of the curved propellant made from the NC. NC having more than about 13% nitrogen is not as soluble in as wide a variety of solvents as those grades of NC having less than 13%. The viscosity of the pyro NC (a measure of molecular weight) as measured in a solution containing 10% NC, 10% of ethyl alcohol (denatured according to the 2B formula) and 80% acetone, using a 5/16" steel ball should range from about 5 sec. to about 15 sec. This viscosity is measured as reported in Joint Army-Navy Specification JAN-N-244. If the molecular weight of the NC is too low it will not serve as a satisfactory binder while if it is too high, the system is too viscous to handle.

The solvent for NC which is used in the process of the present invention is one which is not miscible with water and in general is less than about 5% soluble in water. Suitable solvents are isopropyl acetate and butyl acetate. The preferred solvent is isopropyl acetate. The solvent must not be miscible with water because, if it is, it will be leached from the nitrocellulose and thus not allow the formation of a suitable spherical particle.

The nonionic emulsifying agent used in the present process is generally selected from a group of materials which are esters of polyethenoxy carbohydrate derivatives. Suitable nonionic emulsifying agents are polyoxyethylene sorbitan monolaurate, polyoxyethylene sorbitan monopalmitate, polyoxyethylene sorbitan monooleate, polyoxyethylene sorbitan monostearate, and many others. The molecular weight of the nonionic emulsifying agents can range from about 200 to about 2000.

The anionic emulsifying agent used in the process of the present invention is one of the type such as the dialkyl sodium sulfosuccinates. Di(2 - ethylhexyl)sodium sulfosuccinate (sold as "Aerosol" OT) is particularly suitable for the practice of this invention.

The total concentration of emulsifiers should be from about 2% to about 5%, based on the total amount of water present. The ratio of nonionic to anionic emulsifying agent can range from about 70:30 to about 40:60. The preferred range is from 60:40 to 40:60.

Optionally, stabilizers may be included in the composition to absorb oxides of nitrogen as they are formed by decomposition of the NC on long term storage. The presence of such stabilizers is not required, however, for obtaining the small spherical particles of the present invention. Stabilizers which are suitable include common stabilizers of NC such as diphenylamine, 2-nitrodiphenylamine, ethylcentralite, and many others.

Antifoaming agents may also be used in the composition for making products of the present invention for the purpose of reducing the amount of foam and making separation of the solid spheres from the excess liquid simpler. Again, this foaming agent is not necessary for obtaining spherical products of the present invention. Suitable antifoaming agents are the silicone oils.

The products of the present invention are small, dense, and spherical, ranging in average particle size from about 30 to about 100 microns. The particles are essentially spherical, in most cases being at least 70% spheres with about 20% elongated spheres and about 10% rods present in the total amount. Using the most preferred modifications of the process of the present invention, the percentage of spherical particles ranges from 90–100%. These particles from fluid dispersions in common plasticizers used in formulating solid propellants such as triethyleneglycol dinitrate at room temperatures. When heated, the compositions gel to form the solid propellant desired.

The nitrocellulose-solvent ratio can range from about 1/2.5 to about 1/4. Higher ratios give emulsions of such high viscosity that agitation is difficult. Lower ratios give such thin emulsions that control of particle size is difficult.

The nitrocellulose-water ratio can range from about 1/3 to about 1/5.

The invention is more completely illustrated with the aid of the following examples. Parts where given are by weight.

*Example 1*

Polyoxyethylene sorbitan monolaurate (1.9 parts) and di-(2-ethylhexyl) sodium sulfosuccinate (2.9 parts) are dissolved in 100 parts of isopropyl acetate. To this solution is added 240 parts of water and the emulsion which forms is mixed for five minutes. An additional quantity of 100 parts of isopropyl acetate is then added and mixing continued for five additional minutes. NC, pyro grade having 12.6% nitrogen, (80 parts) is added and the emulsion is then mixed for an additional 30 minutes. Following this agitation period, the emulsion is heated while continuing agitation to distill off the isopropyl acetate-water azeotrope at 76.6° C. After all the azeotrope has been distilled, the temperature is allowed to go to 100° for five minutes to make certain that all isopropyl acetate has been removed. The solid, spherical particles of NC are then separated from the excess liquid in a preheated centrifuge, and dried at 55° C. The product consists of small spheres of NC, 98% of which were spherical with only 1% being elongated spheres and 1% being rods. Fifty percent of the particles are 62 microns in diameter or smaller and 90% are 43 microns in diameter or larger. 95% of the particles are less than 104 microns in diameter. The particle density of the spheres is 1.66 grams per milliliter.

The above preparation is repeated using a NC having 12.0% nitrogen giving essentially the same results as that described above.

*Examples 2, 3, 4, and 5*

The procedure given in Example 1 is repeated varying the ratio of polyoxyethylene sorbitan monolaurate to di-(2-ethylhexyl) sodium sulfosuccinate. The total amount of emulsifier is 4% based on the water content present or 9.6 parts. The following table shows the results obtained when the emulsifier ratio is varied:

| Example | 2 | 3 | 4 | 5 |
|---|---|---|---|---|
| Percent polyoxyethylenesorbitan monolaurate | 70 | 60 | 50 | 40 |
| Percent di-(2-ethylhexyl) sodium sulfosuccinate | 30 | 40 | 50 | 60 |
| Avg. particle dia. in microns | 61 | 66 | 60 | 66 |
| Percent spheres | 80 | 60 | 70 | 90 |
| Percent elongated spheres | 10 | 20 | 20 | 5 |
| Percent rods | 10 | 20 | 10 | 5 |
| Yield of product (percent of theory) | 55 | 82 | 90 | 98 |

*Example 6*

The procedure of Example 1 is repeated using butyl acetate instead of the isopropyl acetate. The procedure is exactly the same except the butyl acetate water azeotrope is removed at 90.5° C. instead of 76.6. The product again is spherical and has a particle density of 1.66 grams per milliliter.

The invention has been completely described hereinbefore. Many additional modifications will be apparent to those skilled in the art without departing from the invention concept.

We claim:
1. A process for manufacturing small particle nitrocellulose which comprises
   (a) mixing nitrocellulose, a water-immiscible nitrocellulose solvent, less than about 5% soluble in water, water, an anionic emulsifying agent, selected from the group consisting of dialkyl sodium sulfosuccinates and a nonionic emulsifying agent selected from the group consisting of polyethenoxy sorbitan esters of fatty acids, while agitating the mixture;
   (b) distilling off the solvent-water azeotrope while continuing agitation;
   (c) separating small dense particles of nitrocellulose from the liquid.
2. The process of claim 1 wherein the nitrocellulose contains from about 12 to about 13% nitrogen and the water-immiscible solvent is selected from the group consisting of isopropyl acetate and butyl acetate.
3. A process for the preparation of substantially spherical nitrocellulose particles having a particle diameter within the range of from about 30 to about 100 microns which comprises
   (a) mixing under agitation, pyro grade nitrocellulose, water, a solvent selected from the group consisting of isopropyl acetate and butyl acetate, a nonionic emulsifying agent selected from the group consisting of polyoxyethylene sorbitan monolaurate, polyoxyethylene sorbitan monopalmitate, polyoxyethylene sorbitan monopalmitate and polyoxyethylene sorbitan monostearate, an anionic emulsifying agent selected from the group consisting dialkyl sodium sulfosuccinates, the ratio of said solvent to said nitrocellulose being from about 2.5/1 to about 4/1, the ratio of said water to said nitrocellulose being from about 3/1 to about 5/1, the sum of said nonionic emulsifying agent and said anionic agent being from about 2% to about 5% of the weight of water present, and the ratio of said nonionic emulsifying agent to said anionic emulsifying agent being from about 60/40 to about 40/60;
   (b) distilling off the isopropyl acetate-water azeotrope while continuing agitation;
   (c) separating the spheres of nitrocellulose from the liquid present.

References Cited by the Examiner
UNITED STATES PATENTS
2,027,114   1/1936   Olsen et al. _____ 149—2
2,916,996   12/1959  Coffee _____ 149—92 X REUBEN EPSTEIN, *Primary Examiner.*
LEON D. ROSDOL, CARL D. QUARFORTH,
*Examiners.*